United States Patent Office 3,346,631
Patented Oct. 10, 1967

3,346,631
LIQUID CARBOXYLATED POLYMERS AND
METHOD OF PREPARING THE SAME
Thomas W. Boyer, Richard C. Chang, and Edward L.
Ries, Louisville, Ky., assignors to American Synthetic
Rubber Corporation, Louisville, Ky., a corporation of
Delaware
No Drawing. Filed Oct. 29, 1963, Ser. No. 319,696
6 Claims. (Cl. 260—523)

This application is a continuation-in-part of application Ser. No. 165,253 filed Jan. 9, 1962, now abandoned, by the same inventors.

This invention relates to liquid carboxylated polymeric products and to a method of preparing the same by ozonolysis.

More particularly, the present invention relates to carboxylated polymeric products and to a method of making said products by reacting polymers, such as the various polybutadienes, polyisoprenes and copolymers, terpolymers and polymers derived from four or more monomers which polymers contain olefinic unsaturation, with ozone to form carboxylated polymer products in liquid form.

It is a well known fact that ozone reacts with chemical compounds containing olefinic unsaturation, such as natural rubber, synthetic rubber and rubber goods generally. The process whereby ozone is used to convert such olefinically, unsaturated compounds or polymeric chains to more simple saturated or unsaturated oxygenated compounds is known as ozonolysis or ozonization.

We have now found that, surprisingly, the reaction between ozone and polymeric material must be performed under controlled conditions to produce the desired product in liquid form. In this invention, the desired product refers to a gel-free, liquid product, which can be vulcanized or cross-linked to produce useful commercial products.

It is, therefore, an object of this invention to provide a novel process for the manufacture of liquid carboxylated polymeric products.

A further object of this invention is to provide a more economical process for the manufacture of liquid carboxylated polymeric products by reacting polymers containing olefinic unsaturation with a feed gas mixture having a low concentration of ozone, less than 0.5% by weight and preferably about 0.1%.

A further object of this invention is to provide novel commercially useful liquid products which are formed by the aforementioned ozonization process.

These and other objects of this invention will be apparent from the description hereinafter.

The novel process of this invention comprises dissolving a solid or liquid polymer, derived from the polymerization of a conjugated diene monomer or mixture of such monomers with other monomers copolymerizable therewith in a solvent of a type that is suitable as a medium in which to carry out ozonization reactions. Solvents falling in this category are chlorinated solvents such as carbon tetrachloride; paraffinic solvents such as pentane, hexane and heptane; aromatic solvents such as benzene and toluene and many others familiar and obvious to those skilled in the art of ozonolysis. The concentration of polymer in the solution is generally in the range from 0.1 gm./100 ml. to 50 gm./100 ml. of solvent and preferably about 5 gm./100 ml. of solvent. A gas mixture containing a low concentration of free ozone, less than 0.5% by weight of ozone (or up to 6.0 mg./1 of ozone) and preferably about 0.1%, is allowed to bubble through the said polymer solution which is maintained in the temperature range between —80° C. and 150° C., and preferably around 10° C., until a predetermined ozone/polymer weight ratio has been obtained.

When the ozonization has been terminated, the product is processed, for example with live steam, to convert the ozonized polymer to carboxylated polymer. A large portion of the solvent is removed in this process and the product becomes a white, creamy material containing a small amount of solvent and a large amount of water. This wet product is then dissolved in a solvent such as benzene, toluene or carbon tetrachloride. An alternative method for arriving at this stage is to process the product with live steam under reflux conditions to avoid the loss of solvent and thus eliminate the necessity for redissolving the polymer. Residual small amounts of solid undesirable materials are then removed at this point by mechanical means such as filtration or centrifugation. The final, dried, liquid polymeric product is obtained by vacuum drying the filtrate.

We have found that the microstructure, i.e., cis-1,4-, trans 1,4- and 1,2-addition configurations, of the polymeric chain of the liquid product is not appreciably different from that of the parent material following the introduction of the carboxyl groups. For example, when a polybutadiene having 95% cis 1,4 configuration is used as the starting material, the final liquid product contains about 95% cis 1,4 configuration.

Polymeric materials applicable as starting materials in the preparation of our novel products include liquid and solid polymers of conjugated diene monomers or mixtures of these monomers with co-polymerizable monomers. By way of illustration it is to be noted that the co-monomer used with butadiene, for example, can be any suitable polymerizable unsaturated organic compound heretofore co-polymerized with butadiene. Among these monomers which are capable of co-polymerizing with the butadiene are: olefins (e.g., isobutylene), aryl olefins and substituted aryl olefins (e.g., styrene, p-chlorostyrene, p-methoxystyrene, alpha methyl styrene, vinyl naphthalene, and the like); unsaturated organic acids (acrylic and methacrylic); alkyl esters of acrylic and methacrylic acids (e.g., methyl acrylate, methyl methacrylate, butyl acrylate, and the like); nitriles of acrylic and methacrylic acids (e.g., acrylonitrile, methacrylonitrile, and the like); vinylidene chloride; vinyl ketones (e.g., methyl vinyl ketones); vinyl ethers; vinyl carbazole, vinyl furan; vinyl pyridine; and the like. These polymers can be prepared by any of the usual polymerization methods including mass, emulsion and solution polymerization methods.

According to the process of the present invention, a suitable liquid polymer such as liquid, carboxylated, cis 1,4-polybutadiene having a viscosity in the range of 0.1 to 10,000,000 poises at 25° C. can be obtained by controlling the ozone/polymer weight ratio using controlled concentrations of ozone in the feed gas mixture as shown by Table 1 below.

TABLE 1

| Concentration of Ozone in the Feed Gas | | Ozone/Polymer Weight Ratio, gm./gm. | State of Product | Viscosity [1] | Acid No. [2] |
|---|---|---|---|---|---|
| Mg./l. | Wt. percent | | | | |
| 0.45 | 0.038 | 0.164 | Liquid | 0.25 | 0.149 |
| 0.82 | 0.069 | 0.047 | Liquid | 9 | 0.081 |
| 0.82 | 0.069 | 0.037 | Liquid | 16 | 0.052 |
| 0.82 | 0.069 | 0.107 | Liquid | 4,000 | 0.024 |
| 0.94 | 0.079 | 0.030 | Liquid | 166 | 0.038 |
| 0.94 | 0.079 | 0.028 | Liquid | 449 | 0.036 |
| 0.94 | 0.079 | 0.024 | Liquid | 1,570 | 0.032 |
| 4.20 | 0.354 | 0.083 | Liquid | 53 | 0.075 |
| 4.20 | 0.354 | 0.064 | Liquid | 380 | 0.063 |
| 14.20 | 1.20 | 0.145 | Gel and liquid mixture | | |
| 14.20 | 1.20 | 0.056 | Gel | | |
| 34.00 | 2.87 | 0.173 | Gel and liquid mixture | | |
| 34.00 | 2.87 | 0.093 | Gel | | |
| 34.00 | 2.87 | 0.047 | Gel | | |

[1] Viscosity was measured with Brookfield Viscometer at 25° C., poises.
[2] Acid Number = equivalents of carboxylic acid per 100 grams of polymer.

The totally unexpected and obviously critical importance of the ozone concentration in the air or oxygen stream is dramatically illustrated by the following data (items 2 and 14) extracted from Table 1.

TABLE 2

| Ozone Concentration | | Ozone/Polymer Weight Ratio | State of Product | Viscosity, Poise |
|---|---|---|---|---|
| Mg./l. | Weight, Percent | | | |
| 0.82 | 0.069 | 0.047 | Liquid | 9 |
| 34.00 | 2.87 | 0.047 | Solid, gel | (¹) |

[1] Too high to measure.

The concentration of ozone in the feed gas mixture can be altered by adjusting the voltage across the ozonator, by adjusting the flow rate of oxygen into the ozonator and by using free oxygen or air to dilute the effluent gas stream from the ozonator or a combination of these three means.

The liquid carboxylated material produced in the present invention is useful as the binder for solid propellants. Also a rubbery product can be obtained when the said product reacts with polyepoxide, polyimine or polyisocyanate compounds. The carboxylated cis 1,4- and trans 1,4- polybutadienes and the butadiene-styrene copolymers are represented structurally as follows:

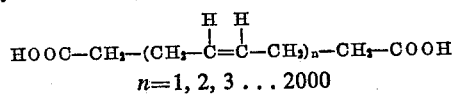

$n = 1, 2, 3 \ldots 2000$

Carboxy-terminated, cis 1,4- polybutadiene

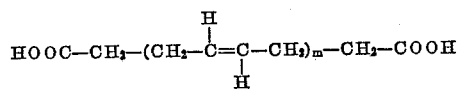

$m = 1, 2, 3 \ldots 2000$

Carboxy-terminated, trans 1,4-polybutadiene

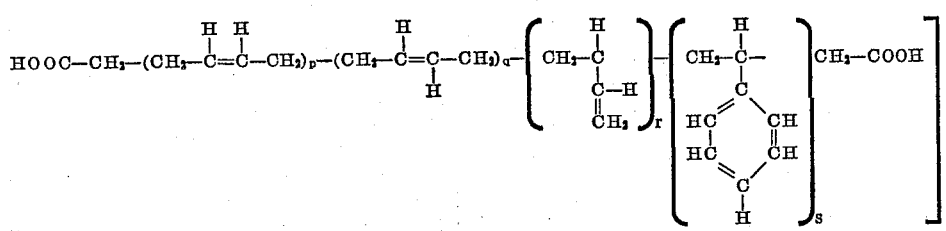

Carboxy-terminated, butadiene-styrene copolymer

The cis 1,4-, trans 1,4- and 1,2-butadiene units and the styrene units in the chain are randomly distributed. The $p$, $q$, $r$ and $s$ in the above formula can each vary in number over a very wide range from one up to at least 2000.

The present invention will be more completely understood by reference to the following examples. In each instance all parts and percentages are by weight unless otherwise specified.

Example 1

A charge of polymer solution comprising 90 grams of solid copolymer of styrene and butadiene and 0.915 liters of carbon tetrachloride was placed in a reactor provided with stirring means and a tube for the introduction of ozone gas below the surface. Upon the completion of charging, the reactant mixture was cooled to 10° C. and ozonization was started. An ozone-air mixture containing 0.97 mg./l. of ozone was bubbled through the rapidly stirred mixture at the aforementioned temperature for a period of 4 hours. In this period, a total of 3.44 grams of ozone was passed through the solution. At the end of this period, the ozone-air mixture was cut off and the reaction mixture thereafter was digested with live steam for 10 to 12 hours to convert ozonides to carboxylic materials. At this point the product was a white, creamy material. The white, creamy material was then dissolved in toluene and any small amount of undesirable solids was removed from the said solution by filtration. The liquid, carboxylated polymer was recovered by vacuum drying. The final, dried, liquid product had a viscosity of 160 poises and an acid number of 0.039 gram molecular equivalents of carboxylic acid per 100 grams of polymer.

Example 2

The same procedure was used as in Example 1 with a charge of polymer solution containing 90 grams of solid copolymer of isoprene and isobutylene and 0.950 liters of carbon tetrachloride. The ozone-air mixture contained 0.45 mg./l. of ozone and a total of 3.44 grams of ozone was added over a period of 4 hours. The final, dried, liquid product had a viscosity of 4280 poises and an acid number of 0.029 gram molecular equivalents of carboxylic acid per 100 grams of polymer.

Example 3

The same procedure was used as in Exemple 1 with a charge of polymer solution containing 1025 grams of solid polybutadiene (95–96% cis, 1,4 content) and 21.6 liters of carbon tetrachloride. The ozone-air mixture contained 0.94 mg./l. of ozone and a total of 24.3 grams of ozone was added over a period of 8.5 hours. The final, dried, liquid product had a viscosity of 1570 poises and an acid number of 0.032 gram molecular equivalents of carboxylic acid per 100 grams of polymer. The microstructure of this product was determined with a Beckman infrared spectrophotometer. The trans 1,4, vinyl, and cis 1,4 concentrations were 1.4%, 2.5% and 96.1% respectively.

*Example 4*

The same procedure was used as in Example 1 with a charge of polymer solution containing 150 grams of solid polybutadiene (95–96% cis 1,4 content) and 4 liters of carbon tetrachloride. The ozone-air mixture contained 0.82 mg./l. of ozone and a total of 7.05 grams of ozone was added over a period of 8 hours. The final, dried, liquid product had a viscosity of 9 poises and an acid number of 0.081 gram molecular equivalents of carboxylic acid per 100 grams of polymer. The trans 1,4, vinyl, and cis 1,4 concentrations were 1.6%, 2.6% and 95.8% respectively.

*Example 5*

The same procedure was used as in Example 1 with a charge of polymer solution containing 150 grams of solid polybutadiene (95–96% cis 1,4 content) and 4 liters of carbon tetrachloride. The ozone-air mixture contained 0.82 mg./l. of ozone and a total of 5.55 grams of ozone was added over a period of 6.5 hours. The final, dried, liquid product had a viscosity of 16 poises and an acid number of 0.052 gram molecular equivalents of carboxylic acid per 100 grams of polymer. The trans 1,4, vinyl and cis 1,4 concentrations were 1.5%, 2.4% and 96.1% respectively.

*Example 6*

The same procedure was used as in Example 1 with a charge of polymer solution containing 150 grams of solid polybutadiene (95–96% cis 1,4 content) and 4 liters of carbon tetrachloride. The ozone-air mixture contained 0.82 mg./l. of ozone and a total of 2.58 grams of ozone was added over a period of 3 hours. The final, dried, liquid product had a viscosity of 4000 poises and an acid number of 0.024 gram molecular equivalents of carboxylic acid per 100 grams of polymer. The trans 1,4, vinyl, and cis 1,4 concentrations were 1.5%, 3.0% and 95.5% respectively.

*Example 7*

The same procedure was used as in Example 1 with a charge of polymer solution containing 40 grams of solid polybutadiene (95–96% cis 1,4 content) and 0.8 liter of carbon tetrachloride. The ozone-air mixture contained 4.2 mg./l. of ozone and a total of 3.30 grams of ozone was added over a period of 11 hours. The final, dried, liquid product had a viscosity of 53 poises and an acid number of 0.075 gram molecular equivalents of carboxylic acid per 100 grams of polymer. The trans 1,4, vinyl, and cis 1,4 concentrations were 1.6%, 2.6% and 95.8% respectively.

*Example 8*

The same procedure was used as in Example 1 with a charge of polymer solution containing 40 grams of solid polybutadiene (95–96% cis 1,4 content) and 0.8 liter of carbon tetrachloride. The ozone-air mixture contained 4.2 mg./l. of ozone and a total of 2.57 grams of ozone was added over a period of 9 hours. The final, dried, liquid product had a viscosity of 380 poises and an acid number of 0.063 gram molecular equivalents of carboxylic acid per 100 grams of polymer. The trans 1,4, vinyl, and cis 1,4 concentrations were 1.8%, 2.2% and 96.0% respectively.

*Example 9*

The same procedure was used as in Example 1 with a charge of polymer solution containing 950 grams of solid polybutadiene, having 95–96% cis 1,4 content and 20 liters of carbon tetrachloride. The ozone-air mixture contained 0.94 mg./l. of ozone and a total of 28.6 grams of ozone was added over a period of 10 hours. The final, dried, liquid product had a viscosity of 166 poises and an acid number of 0.038 gram molecular equivalents of carboxylic acid per 100 grams of polymer. The trans 1,4, vinyl, and cis 1,4 concentrations were 1.4%, 2.5% and 96.1% respectively.

*Example 10*

The same procedure was used as in Example 1 with a charge of polymer solution containing 1025 grams of solid polybutadiene (95–96% cis 1,4 content) and 21.6 liters of carbon tetrachloride. The ozone-air mixture contained 0.94 mg./l. of ozone and a total of 28.6 grams of ozone was added over a period of 10 hours. The final, dried, liquid product had a viscosity of 449 poises and an acid number of 0.036 gram molecular equivalents of carboxylic acid per 100 grams of polymer. The trans 1,4 vinyl, and cis 1,4 concentrations were 1.4%, 2.6% and 96.0% respectively.

*Example 11*

The same procedure was used as in Example 1 with a charge of polymer solution containing 680.4 grams of solid polybutadiene (95–96% cis 1,4 content) and 10.3 liters of toluene. The ozone-air mixture contained 1.02 mg./l. of ozone and a total of 21.1 grams of ozone was added over a period of 11 hours. The final, dried, liquid product had a viscosity of 37 poises and an acid number of 0.038 gram molecular equivalents of carboxylic acid per 100 grams of polymer. The trans 1,4, vinyl, and cis 1,4 concentrations were 1.8%, 2.8% and 95.4% rerespectively.

*Example 12*

The same procedure was used as in Example 1 with a charge of polymer solution containing 680.4 grams of solid polybutadiene (95–96% cis 1,4 content) and 10.3 liters of toluene. The ozone-air contained 1.02 mg./l. of ozone and a total of 17.3 grams of ozone was added over a period of 9 hours. The final, dried, liquid product had a viscosity of 67 poises and an acid number of 0.033 gram molecular equivalents of carboxylic acid per 100 grams of polymer. The trans 1,4, vinyl, and cis 1,4 concentrations were 1.9%, 3.0% and 95.1% respectively.

*Example 13*

The same procedure was used as in Example 1 with a charge of polymer solution containing 250 grams of solid polybutadiene (95–96% cis 1,4 content) and 6.5 liters of toluene. The ozone-air mixture contained 0.45 mg./l. of ozone and a total of 41 grams of ozone was added over a period of 48 hours. The final, dried, liquid product had a viscosity of 0.25 poises and an acid number of 0.149 gram molecular equivalents of carboxylic acid per 100 grams of polymer. The trans 1,4, vinyl, and cis 1,4 concentrations were 2.2%, 2.1% and 95.7% respectively.

While the illustrative embodiments of the invention have been described hereinbefore with particularity, it will be understood that various other modifications will be apparent to and can readily be made by those skilled in the art without departing from the scope and spirit of the invention. Accordingly, it is not intended that the scope of the claims appended hereto be limited to the examples and description set forth herein but rather that the claims be construed as encompassing all the features of patentable novelty which reside in the present invention including all features which would be treated as equivalents thereof by those skilled in the art to which the invention pertains.

What is claimed is:

1. A process for the preparation of carboxy terminated liquid butadiene polymer comprising dissolving a high molecular weight butadiene polymer in an inert solvent therefor, contacting the resulting solution with a gas containing ozone, said ozone being present in an amount of less than 0.5% by weight of the total gas, and in at least a sufficient amount to obtain the desired polymer viscosity at a temperature in the range between $-80°$ C. and $150°$ C., stopping the flow of ozone when the desired polymer viscosity in the range of 0.1 to 10,000,000 poises at $25°$ C. has been reached, removing the solvent and recovering the carboxylated liquid butadiene polymer, the polymer viscosity being determined by isolating samples during the reaction and measuring the viscosity.

2. A process for preparing a carboxy terminated liquid polybutadiene having a viscosity in the range of 0.1 to 10,000,000 poises at $25°$ C., comprising dissolving a high molecular weight polybutadiene in an inert solvent, contacting the resulting solution with a gas containing ozone, said ozone being present in an amount of less than 0.5% by weight of the total amount of gas, and in at least a sufficient amount to obtain the desired polymer viscosity at a temperature in the range between $-80°$ C. and $150°$ C., stopping the flow of ozone when the desired polymer viscosity has been reached, said desired polymer viscosity being at least about 0.1 poise at $25°$ C., processing the product with live steam and removing the solvent and recovering the carboxylated liquid polybutadiene, the polymer viscosity being determined by isolating samples during the reaction and measuring the viscosity.

3. The process of claim 1 in which the high molecular weight butadiene polymer is a copolymer of butadiene and styrene.

4. The process of claim 1 in which the high molecular weight butadiene polymer is a copolymer of isoprene and isobutylene.

5. The process of claim 1 in which the high molecular weight butadiene polymer is a high molecular weight polybutadiene having a cis-1,4 configuration content greater than 70% to yield a liquid carboxylated, polybutadiene having a cis-1,4 configuration content greater than 70%.

6. The product prepared by the process of claim 1.

References Cited

UNITED STATES PATENTS

| | | |
|---|---|---|
| 2,665,280 | 1/1954 | Knobloch et al. |
| 2,819,279 | 1/1958 | Brown et al. _____ 260—544 XR |
| 3,049,523 | 8/1962 | Roussel _____ 260—537 XR |
| 3,059,028 | 10/1962 | Perry, Jr. _____ 260—533 |

OTHER REFERENCES

Marvel et al., J. Org. Chem., 16, 1951, pp. 838–853.
Long, Chemical Reviews, 27, 1940, pp. 450–451.

RICHARD K. JACKSON, *Primary Examiner.*

JOSEPH P. BRUST, LORRAINE A. WEINBERGER,
*Examiners.*

S. B. WILLIAMS, *Assistant Examiner.*